Figure 1:
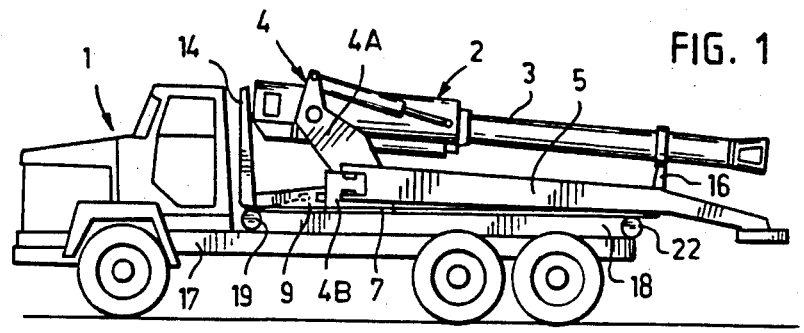
Figure 2:
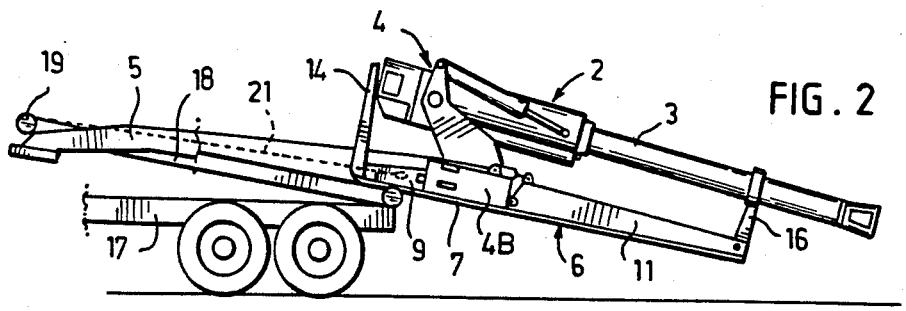

United States Patent [19]

Collanus et al.

[11] Patent Number: 4,729,279
[45] Date of Patent: Mar. 8, 1988

[54] DEVICE FOR TRANSPORT OF CANNON OR SUCH LIKE

[75] Inventors: Heikki Collanus, Pirkkala; Seppo Nikula, Tampere; Ari Kanervo, Tampere; Leo Häkkinen, Tampere, all of Finland

[73] Assignee: OY Tampella AB, Tampere, Finland

[21] Appl. No.: 915,640

[22] Filed: Oct. 6, 1986

Related U.S. Application Data

[63] Continuation of Ser. No. 596,513, Apr. 4, 1984, abandoned.

[30] Foreign Application Priority Data

Apr. 8, 1983 [FI] Finland ................. 831189

[51] Int. Cl.[4] ............................. F41F 23/10
[52] U.S. Cl. ................................. 89/40.13
[58] Field of Search ............. 89/40.13, 40.14, 40.01, 89/40.04, 40.16, 37.05, 40.02

[56] References Cited

U.S. PATENT DOCUMENTS 1,310,878  7/1919  Schneider ................. 89/40.01
2,600,462  6/1952  Bateman ................... 89/40.01

FOREIGN PATENT DOCUMENTS 314818   10/1919  Fed. Rep. of Germany ..... 89/40.13
2251846   5/1973  Fed. Rep. of Germany ..... 89/40.01
532682    2/1922  France ................... 89/40.04
800842    7/1936  France ................... 89/40.15

OTHER PUBLICATIONS

Narrow-Gauge Equipment, 4/23/19, Plate IV.

Primary Examiner—Stephen C. Bentley
Assistant Examiner—Stephen M. Johnson
Attorney, Agent, or Firm—Ladas & Parry

[57] ABSTRACT

A device for transport of a cannon or such like with a vehicle, which cannon (2) comprises a gun barrel (3) and a carriage (4) supporting the barrel. The gun carriage is of an interchangeable platform construction, so that the cannon can be transported with a truck vehicle (1) equipped with a platform changing mechanism and lowered to the ground for firing with the help of the platform changing mechanism. The carriage has a bearing rail system (6) compatible with the platform changing mechanism of the truck vehicle, whereas the rails (7) of the bearing rail system are placed either on the lower part of the carriage (4) or on the supporting arms of the carriage.

12 Claims, 11 Drawing Figures

DEVICE FOR TRANSPORT OF CANNON OR SUCH LIKE

This is a continuation of application Ser. No. 596,513, filed Apr. 4, 1984 and now abandoned.

The object of the present invention is a device for transport of a cannon or such like with a vehicle, which cannon comprises a gun barrel and a carriage supporting the barrel.

Even if the invention in the following, in order to clarify the invention, is primarily described in connection with a cannon, the invention is not limited only to cannons, but it can also be adapted to, for example, heavy mortars and similar transportable arms.

In order to move a field gun from one place to another, it has been known to furnish the gun carriage with wheels and a draw link, so that the cannon can be connected to a hauling vehicle and hauled by this.

This transporting method of a cannon makes indeed possible even the use of a normal truck as hauling vehicle, but its disadvantage is, however, that the transport speed is relatively low, as it is a question of a hauled load, and that the transport is difficult in extreme operating conditions, as in snow and on rough ground, because the wheels of the cannon cause additional drag and the grip of the wheels of the hauling vehicle is not good enough. The vehicle combination is furthermore relatively long, which fact makes the driving difficult. To get the cannon ready to fire is also rather cumbersome work.

It has also been known to provide a carriage with wheels with an own power unit and transmission devices for the wheels, so that the cannon can be moved independently. Such a construction moving by itself is best suited to move cannons only relatively short distances, when again long-distance transport is still meant to be made as haulage with separate hauling vehicles. The construction of a cannon moving by itself is relatively expensive and requires service also during storage.

From the U.S. Pat. No. 4,317,405 it is already known to mount a cannon with its carriage integrally to a transport vehicle—a caterpillar vehicle—of its own. The carriage is provided with stands, which are lowered down when the cannon is made ready to fire to support the carriage firmly to the ground in order to obtain a satisfactory stability for firing and to free the vehicles from the stresses caused by the firing.

Such a transport solution is, however, very expensive as it ties to each cannon almost an entire special vehicle. A caterpillar vehicle is furthermore not so suitable for long-distance transport. The construction also demands service during storage. A considerable disadvantage is furthermore that the cannon is left high up because of the integrally mounted caterpillar vehicle below it.

The aim of the present invention is to provide a device for transport of a cannon or such like, which device avoids the above-mentioned disadvantages and makes possible the transport of the cannon, almost ready to fire, with truck vehicles in normal use and still permits firing from a normal ground position. This aim is reached by the device according to the invention, for which it is characteristic that the gun carriage is of an interchangeable platform construction for transporting the cannon with a truck vehicle equipped with a platform changing mechanism.

The invention is based on the idea that by making the gun carriage into a so-called interchangeable platform or by furnishing it with devices with the help of which the carriage can function as a so-called interchangeable platform a normal truck with an interchangeable platform mechanism can be used for the transport of the cannon, which trucks are numerously in use for normal "civil use", and the cannon can simply and quickly be lowered to the ground for firing. The need of a specially constructed and expensive vehicle can be avoided by using a normal truck and even high transport speeds are possible. After the transport, the vehicle is free to be used somewhere else. The cannon can be transported almost ready to fire and, to get the cannon into a firing position, the supporting arms of the carriage can be turned into projecting positions when the cannon is still on the vehicle. The projecting arms balance the cannon when it is lowered down from the vehicle. The cannon can be transported with the vehicle even in extreme conditions because the weight of the cannon increases the grip of the driving wheels of the vehicle. The transport length of the vehicle is relatively short, especially if compared to conventional solutions, so the handling of the vehicle is easier in difficult places.

The system of interchangeable platforms has now attained a wide use, for example, in the field of goods transportation, refuse transportation and others. Then there are rails secured under the open platform, the refuse container or other such like and the truck is equipped with a haulage mechanism, usually with wires, with which the platform can be raised onto the bearing, tiltable beam girders of the truck chassis and drawn wholly onto the girders and correspondingly be lowered from the beam girders to the ground in the opposite order. The system of interchangeable platforms postulates thus only that, on the gun carriage, there is a suitable rail system which can be simply realized in different ways as is described in more detail in the following. A truck with an interchangeable platform is suitable without changes for the use proposed by the invention. The rails for the interchangeable platform can furthermore be used as firing supports for the supporting arms, as a support preventing the pitching of the gun barrel etc.

Figure 5:
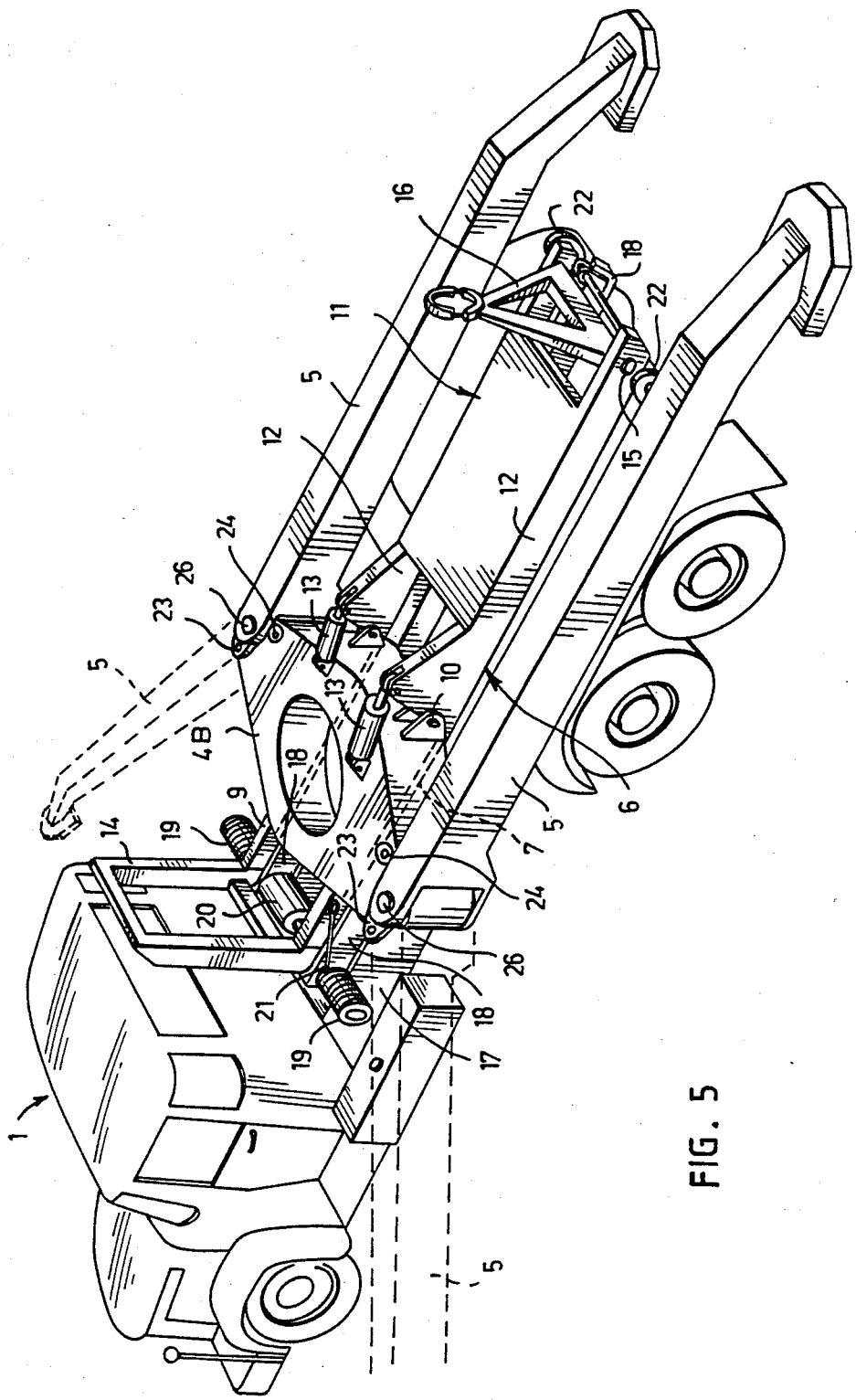
Figure 6:
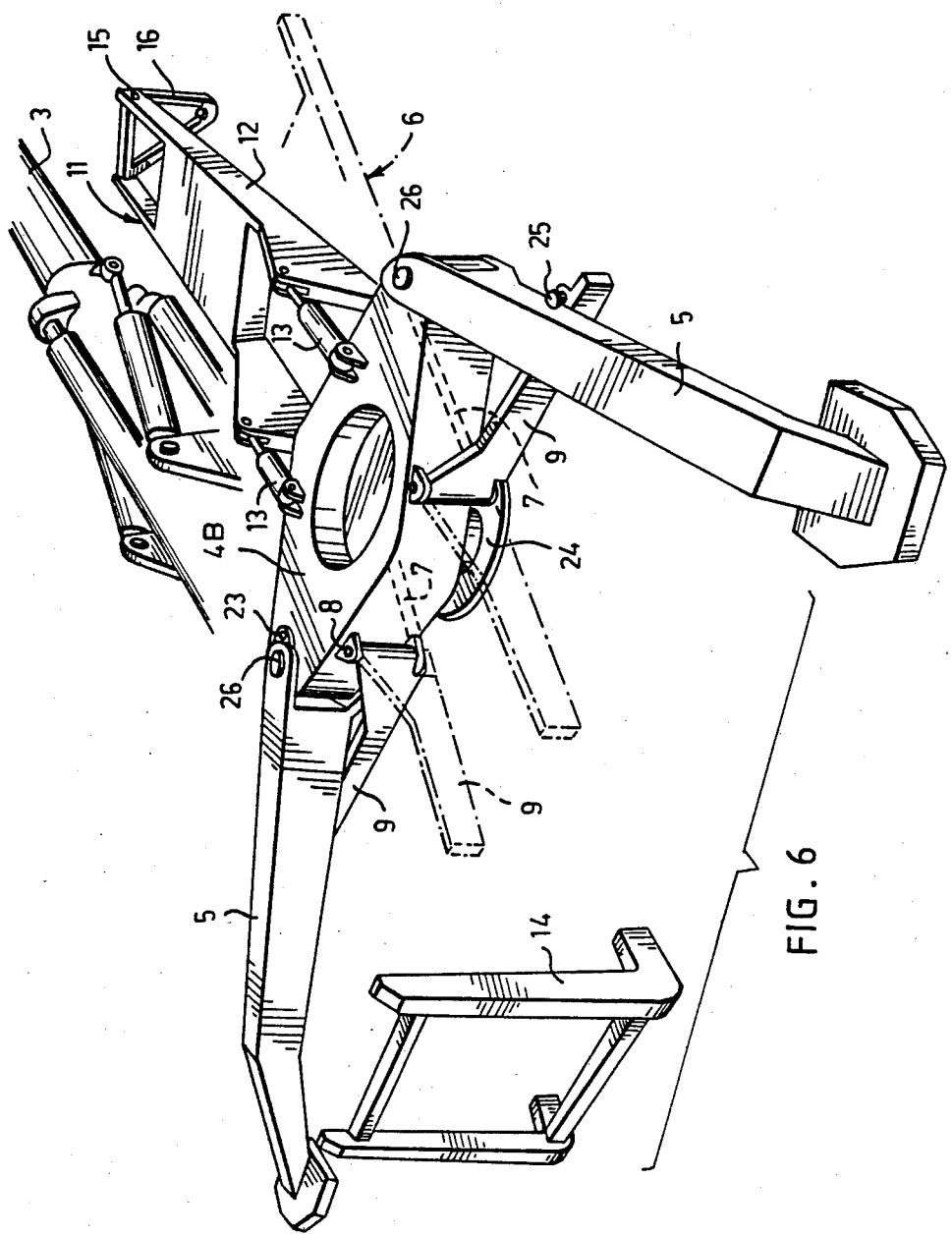
Figure 7:
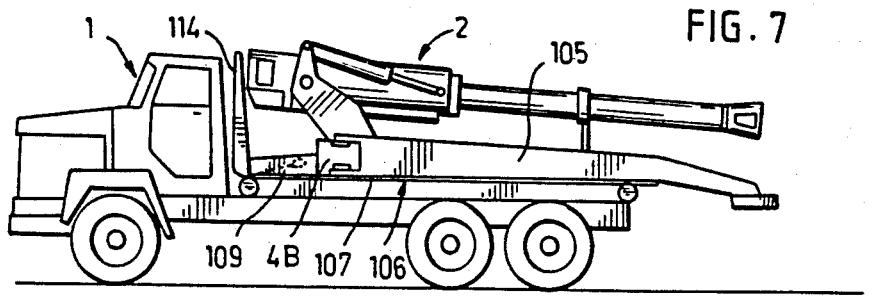
Figure 8:
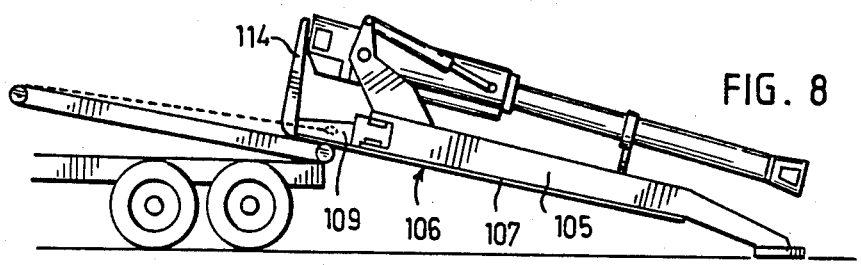
Figure 11:
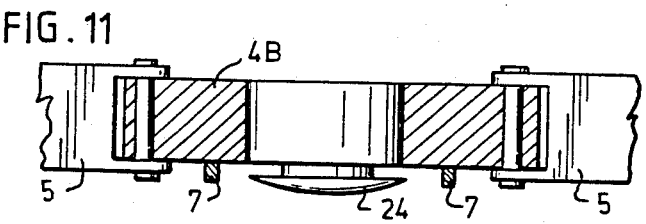

In the following the invention will be described in more detail with reference to enclosed drawings, where FIGS. 1 to 4 show schematically the different operation stages of a device according to a preferable embodiment of the invention seen from the side, FIG. 5 shows, more in detail and with perspective, a device in the transport position, whereas the gun barrel and the top carriage have been removed in order to clarify the invention, FIG. 6 shows a device in the firing position, whereas a part of the gun barrel and the top carriage have been left out in order to clarify the invention, FIGS. 7 to 10 show schematically the different operation stages of a device according to another embodiment seen from the side, and FIG. 11 shows, in a bigger scale, a vertical section of the bottom carriage.

FIGS. 1 to 10 of the drawings show a truck 1 and a field gun 2 transported by the truck, which gun comprises a barrel 3, a carriage 4 and supporting arms 5. The carriage in its turn consists of a top carriage 4A and a bottom carriage 4B pivotably supporting the former. The gun barrel and the top carriage as well as the bearing devices between the top and bottom carriage are known constructions as such and are therefore not explained more in detail in the following.

On the shown embodiment of FIGS. 1 to 6 there is mounted under the bottom carriage 4B a so-called rail system 6 for an interchangeable platform, which system comprises several parts, one after another, which can be locked together into an inflexible combination.

Under the bottom carriage two parallel rails 7 are firmly secured with a space between them. Alternatively these rails can be formed on the bottom carriage when it is manufactured. At one end of the rails by using vertical pivots 8 two arm supports 9 have been pivotably mounted to the bottom carriage, the lower edges of which arm supports consitute direct extensions to the above-mentioned rails. At the opposite end of the rails by using vertical pivots 10 an inflexible rear frame 11 is pivotably mounted to the bottom carriage, the lower edges of the arms 12 of which frame are on the same time direct extensions to the rails. For turning the rear frame by the pivots 10 in a vertical level hydraulic cylinders 13 have been mounted to the bottom carriage, which cylinders are connected to the two arms of the rear frame.

The front ends of the arm supports 9 is provided with an L-shaped control stand 14, which, when secured to the arm supports, forms the front part of the interchangeable platform construction. It is possible to remove the control stand from the arm supports with the help of a not shown locking mechanism.

By using vertical pivots 15 a barrel support 16 is mounted at the rear end of the rear frame 11. The barrel support can preferably be turned round its pivots between two or more operation positions as is described in more detail in the following.

The truck 1 is equipped with a so-called platform changing mechanism, which as regards the using of the invention can be a completely normal construction known as such. A lift frame 18 is pivotably mounted at its rear end to the chassis 17 of the truck, which frame can be raised and lowered as regards the chassis with the help of a not shown tilter. Wire drums 19 are mounted to both sides of the front end of the lift frame, which drums are connected to the driving unit 20 mounted on the lift frame to rotate the drums. Both wire drums are provided with wires 21 of their own. At the rear end of the lift frame there are rolls 22, which rotate around their horizontal axles and the space between said rolls correspond essentially to the space between the two rails of the rail system of the cannon.

The device according to the invention operates in the following way:

In the transport position shown in FIG. 1 the control stand 14, the arm supports 9, the rails 7 of the bottom carriage and the rear frame 11 form an inflexible bearing rail system, which is supported by the slide bars formed by the rolls 22 of the lift frame of the truck and the girders of the lift frame. The supporting arms 5 of the cannon are turned alongside the rear frame 11 of the bearing rail system and locked to the not shown devices in this position for the time of the transport. The barrel support 16 of the rear frame is turned upwards and secured to the gun barrel with a suitable latch to support the barrel.

To lower the cannon to the ground the supporting arms are freed from their lockings and turned about 120° to point slantingly forwards in the transport direction of the truck. The locking ears 23 on the supporting arms fasten or are fastened with suitable latches to the clamps 24 on the bottom carriage to prevent the supporting arms from turning when the cannon is lowered down.

After this the lift frame of the truck is tilted with the help of the tilter, so that the cannon, supported by the rail system, can glide down along the lift frame. The wires are still attached to the cannon so that the gliding down can be controlled by the driving unit.

Figure 3:
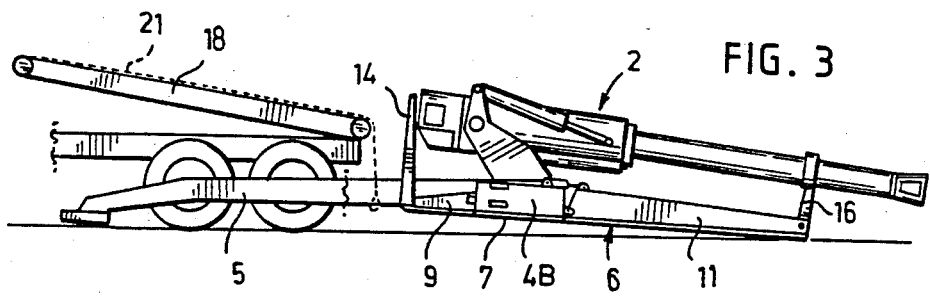
Figure 4:
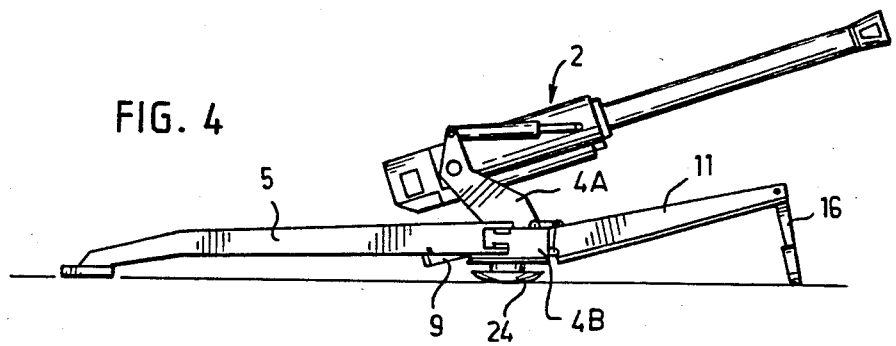

When the cannon has glided down so far along the lift frame that the rear end of the rear frame 11 touches the ground (FIG. 2) the truck is slowly driven forwards, so that the control stand 14 of the rail system passes the rolls 22 of the lift frame and is lowered to the ground with help of the wires as shown in FIG. 3.

To get the cannon ready to fire, the carriage is raised with the help of a hydraulic ground support 24 on the bottom carriage, whereas the control stand 14 of the rail system can be unfastened and the arm supports 9 can be turned to the sides under the supporting arms 5 and locked to these with latches 25 or other suitable locking means (FIG. 6). The barrel support 16 of the rear frame is detached from the barrel and turned downwards, after which the rear frame is raised with the help of the cylinders 13, so that it will not bump into obstacles on the ground when one wants to change the basic direction of the cannon by turning the carriage in a way known per se by using the ground support. When the cannon is in the required basic direction, the barrel support of the rear frame can be turned forwards and pressed towards the ground, so that it functions as a so-called pitch support during the firing.

To get the cannon into transport condition the method is the opposite.

FIGS. 7 to 10 of the drawings show an alternative device which differs to its operating principle from the device shown in FIGS. 1 to 6, in that part of the rail system 106 is mounted to or formed on the supporting arms 105 themselves. In said alternative device rails 107 are secured to the lower edges of the supporting arms, which rails are parallel to each other when the supporting arms are turned and locked in the transport position. The rail system comprises also in this case arm supports 109 mounted to the bottom carriage and an L-shaped control stand 114. The arm supports are then placed so that their lower edges function as extensions to the rails of the supporting arms when the arm supports are made inflexible with the help of the control stand. The rolls of the lift frame of the truck and the slide bars are then adapted to correspond to the space between the rails.

To move the cannon with a truck into transport position and to lower it down to the ground takes place essentially in the same way as described for the earlier mentioned embodiment, except that the supporting arms can be turned only when the cannon has been lowered down so far that the rails of the supporting arms are freed from the rolls of the lift frame of the truck. The drawings and the hereto referring description are meant only to describe the idea of the invention. As to the details the device according to the invention can vary even considerably within the frame of the patent claims.

Instead of an L-shaped control stand, the stand can have different, inclined or curved shapes. The stand does not have to be one removable piece, but each rail can have a separate stand of its own, which can be either removed or turned away. It is also possible to use a construction where such a separate vertical support is not at all used.

To make the construction inflexible, it is possible to use different, firmly attached or removably locked supports in different ways. The arm supports of the supporting arms functioning as rails can correspondingly be either on the level of the rails or turned slantingly upwards or downwards.

Instead of the interchangeable platform construction with wires described in the specification, also other interchangeable platform constructions can be used, such as a platform changing mechanism provided with an endless chain mechanism that can be moved to and fro, or a mechanism provided with a firmly attached hook. If these mechanisms are used, the required fastening and control constructions have of course to be mounted to the rail system or the carriage.

Figure 9:
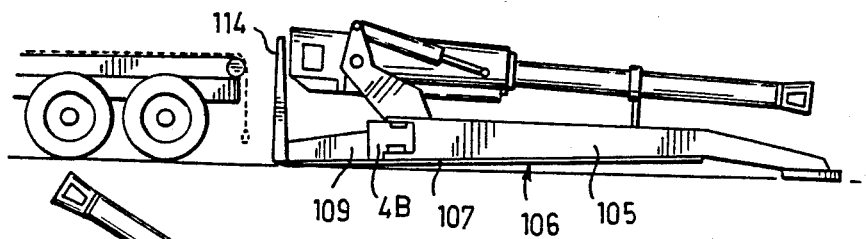
Figure 10:
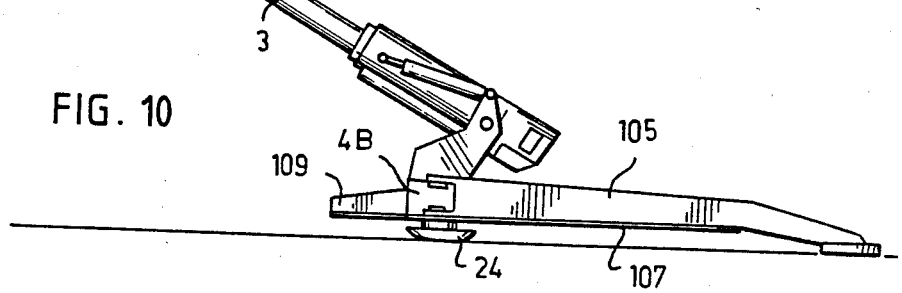

Even if it is shown in FIGS. 3 and 9 that the bearing rail system 6 or 106 touches the ground only with its rear resp. front end when the cannon is lowered down, the construction can also be made such that the rail system is pressed to the ground along its whole length.

What we claim is:

1. A device for loading and unloading a heavy firearm onto and off of a vehicle, said device comprising:
    a carriage having an upper portion and a lower portion, said upper and lower portions being pivotally connected;
    a heavy firearm having a plurality of firing positions mounted upon said upper portion;
    a pair of rails mounted under said lower portion, said rails being underneath said lower portion in each of said firing positions;
    a vehicle having a tipping frame mounted thereon, said tipping frame having a first position for transporting said firearm, said first position being substantially parallel to a longitudinal dimension of said vehicle, and a second position for loading or unloading said firearm, said second position being at an angle with respect to said first position;
    hoist means for raising said firearm from the ground to bring said rails into contact with a fixed point of support on said tipping frame or for lowering said firearm to the ground, said tipping frame being in said second position;
    means for pivoting said tipping frame from said second to first position for transporting said firearm or from said first to said second position for loading or unloading said firearm, whereby said vehicle is available for other uses when said firearm has been unloaded.

2. A device according to claim 1 further comprising a plurality of supporting arms pivotally mounted on the bottom carriage.

3. A device according to claim 2, wherein said rails are substantially parallel to said longitudinal dimension of said vehicle and are provided with a control stand.

4. A device according to claim 3, wherein a part of said rails between the control stand and the bottom carriage is secured to the bottom carriage for rotational movement about an axis substantially perpendicular to said rails, said part of said rails being provided with locking means to secure said part to the supporting arms.

5. A device according to claim 3, wherein said rails are provided with a rear frame projecting in the opposite direction from the bottom carriage regarding the control stand, said rear frame being secured to the bottom carriage for rotational movement about a pivoted axle mounted substantially perpendicular to said rails so that the rear frame is rotatable about a level positioned substantially vertically to a level of the rails.

6. A device according to claim 5, wherein the rear frame is provided with a barrel support pivotably mounted to the rear frame to form a pitch support.

7. A device according to claim 1 further comprising a plurality of supporting arms pivotally mounted to the bottom carriage, said rails being formed on the supporting arms in such manner that the rails are substantially parallel to each other when the supporting arms are moved to the transporting position.

8. A device according to claim 7, wherein said supporting arms projecting from the bottom carriage are attached to the bottom carriage, lower edges of said supporting arms forming extensions to the rails of the supporting arms when the supporting arms are in the transporting position.

9. A device according to claim 8, wherein said rails are provided with an L-shaped control stand removably attached to the ends of said supporting arms.

10. A device according to claim 1 said further comprising supporting arms pivotably mounted on the bottom carriage, said rails being connected to the supporting arms, so that the rails are substantially parallel to each other when the supporting arms are moved to the transporting position.

11. A device according to claim 1 further comprising at least two rail arrangements engaging said tipping frame device in a such manner that each rail arrangement slides on the tipping frame when the carriage is being displaced by the hoisting device.

12. A device according to claim 2, wherein said tipping frame is a roll arrangement rotatable about its substantially horizontal axis.

* * * * *